May 5, 1970 G. MENICOU 3,510,592

CODED AUDIO FREQUENCY DIGITAL TRANSMISSION SYSTEM

Filed Oct. 27, 1966 3 Sheets-Sheet 3

3,510,592

CODED AUDIO FREQUENCY DIGITAL TRANSMISSION SYSTEM

George Menicou, London, England, assignor to International Standard Electric Corporation Filed Oct. 27, 1966, Ser. No. 589,947
Claims priority, application Great Britain, Nov. 2, 1965, 46,285/65
Int. Cl. H04m *11/00*
U.S. Cl. 179—2 4 Claims

ABSTRACT OF THE DISCLOSURE

A coded voice frequency signalling system is provided for signalling between registers. Digits are sent in binary form, using two frequencies $f_1$ and $f_2$ for binary "0" and "1" respectively. A third frequency, $f_n$, is used to provide suffix and prefix for each digit and also to fill the digits inter-bit gaps. The prefix and suffix are made longer than the inter-bit gaps to serve as inter-digital pauses.

The present invention relates to a method of and apparatus for voice frequency signalling for the transmission of digital data in a binary code form.

According to the present invention there is provided a method of transmitting digital information, in which each digit is transmitted in the form of a binary digital code combination, in which the two binary conditions are represented respectively by two different signal frequencies, and in which gaps between successive binary code bits, a prefix to the first code bit and a suffix to the last code bit are conveyed by a third frequency, so that each digit is represented by a continuous alternating current signal.

Figure 1:
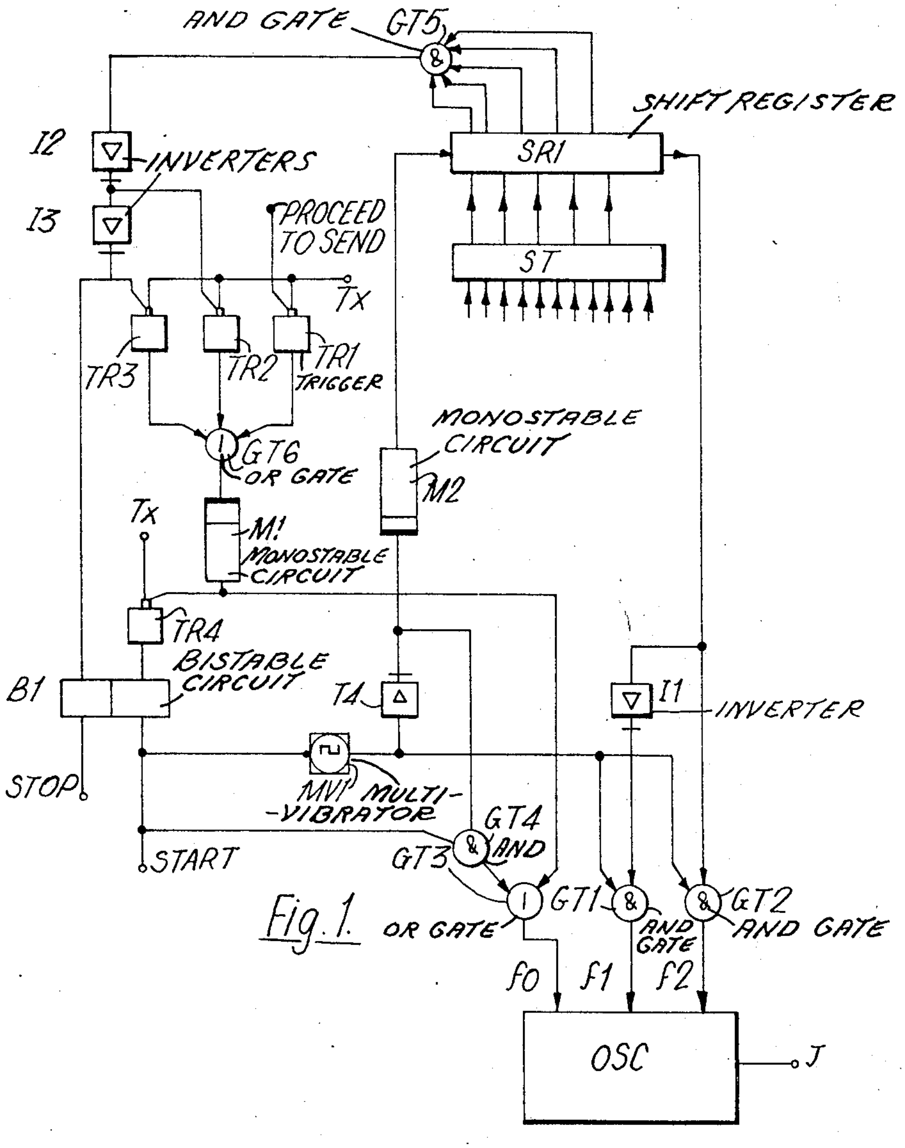
Figure 2:
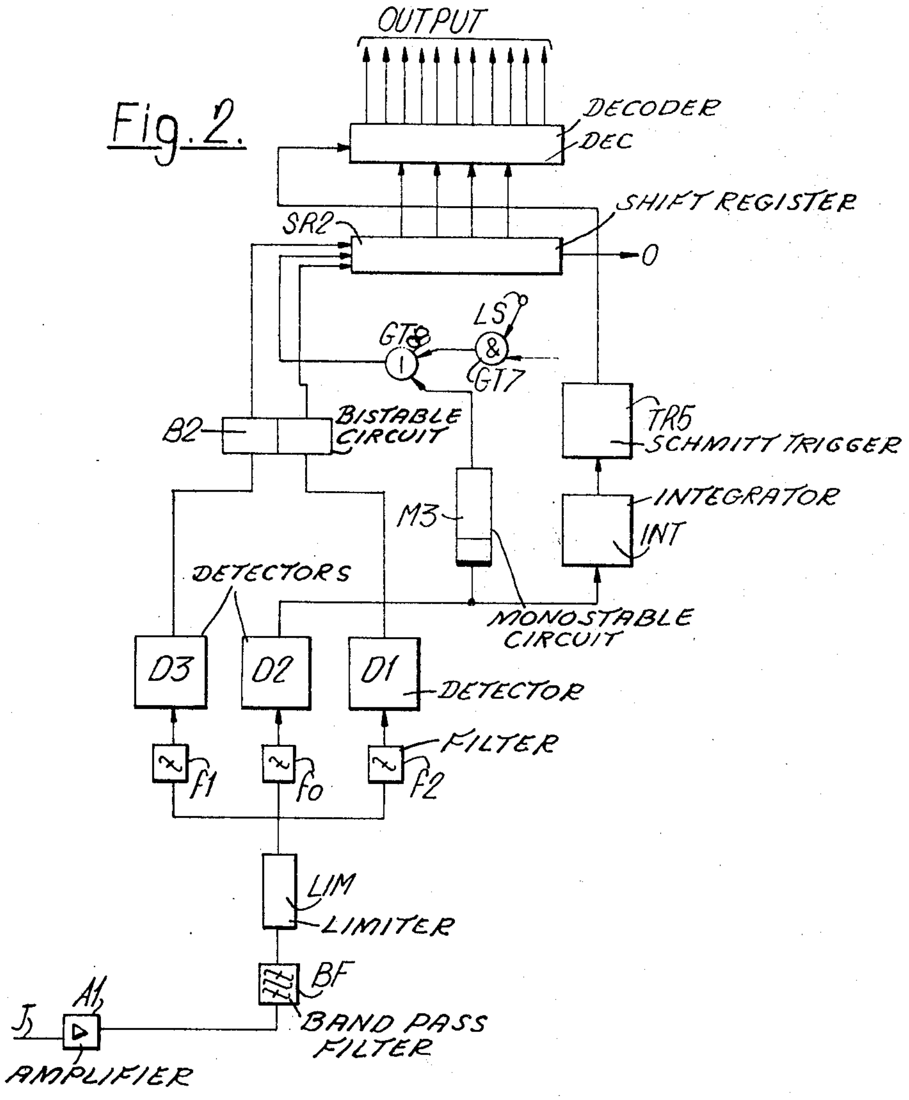
Figure 3:
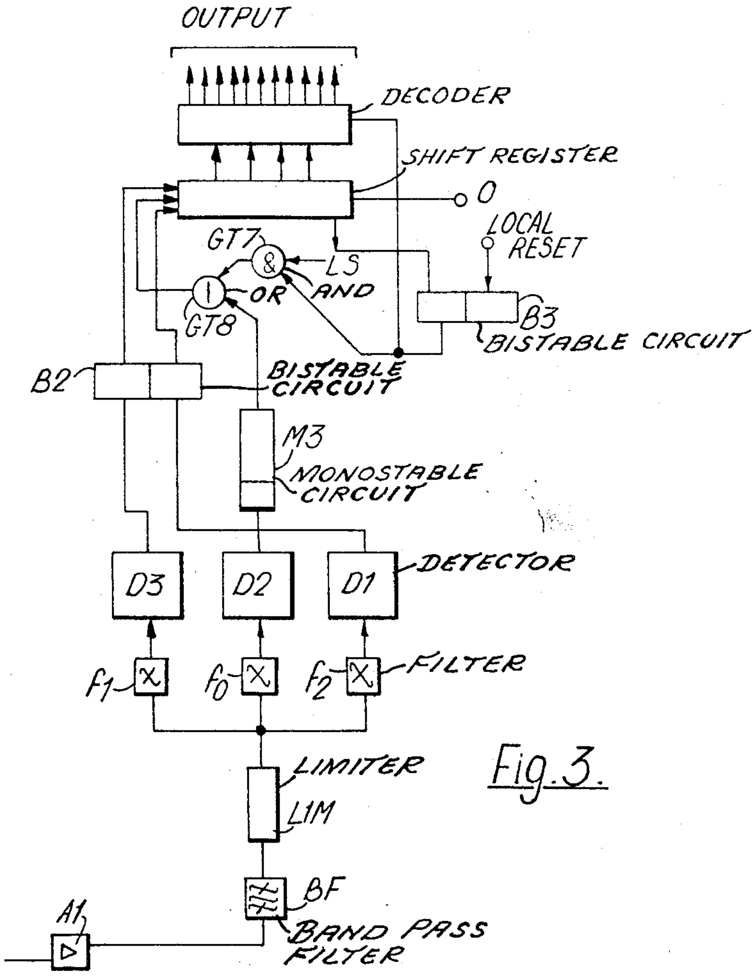

An embodiment of the invention will now be described with reference to the drawings, in which:

FIG. 1 is a transmitter, which in the present case is assumed to be part of the equipment at a register, FIG. 2 is a receiver, which in the present case is also at a register, and FIG. 3 is a receiver which differs somewhat from the receiver of FIG. 2.

The method of voice frequency signalling used herein is that a decimal digit is sent in its binary-coded version as a four bit code combination, and each digit uses three frequencies. Each digit is a complete "frequency envelope" in which the binary digit 0 is represented by one frequency $f_1$ and the binary digit 1 is represented by a further frequency $f_2$, a third frequency $f_o$ being used for the "space" condition between bits of a combination. Each decimal digit also commences and ends with a short period of the $f_o$ frequency. At the receiving end the reception of $f_o$ at the beginning of the digit indicates that a decimal digit is arriving, so that it acts as a prefix therefor.

In one arrangement the duration of the prefix in front of the first digit of a number is 8 ms., each "signal" bit is 4 ms., each "inter-bit" space is also 4 ms. and the inter-digital pause is 8 ms. long.

The frequencies used are as follows:

(a) Forward direction:

$f_1$=850 c./s. for binary 0
$f_o$=1000 c./s. for the "space"
$f_2$=1150 c./s. for binary 1

(b) Backward direction:

$f_1'$=1500 c./s. for binary 0
$f_o'$=1700 c./s. for the "space"
$f_2'$=1850 c./s. for binary 1

This assumes that two-way signalling is called for. The choice of frequencies was based on the characteristics of the junction connections between exchanges over which inter-register V.F. signalling is performed. With certain tyeps of junctions, attenuation increases rapidly above 2000 c./s., and the characteristics of the channel filters in use in the exchanges for which the present method was developed make it desirable to use frequencies above 500 c./s. The signalling method was, in fact, intended for use between exchanges at least one of which is a time division multiplex system.

In the accompanying drawings, the transmitting and receiving apparatus for one direction of transmission are shown, it being assumed that similar arrangements exist for operation in the reverse direction.

The transmitting apparatus of FIG. 1 will first be considered, and the operation in response to the reception at the register of a Proceed to Send signal will be described. This is assumed to have originated from a register connected to the incoming junction at the remote exchange. At the originating register the Proceed to Send signal triggers a monostable circuit M1 via a trigger TR1 and an OR gate GT6, so that the monostable circuit delivers a pulse 8 ms. long. Each of these triggers is a monostable circuit which on reception of an input pulse delivers over its output a short pulse to cause a successive operation. This pulse is applied to the oscillator OSC via gate GT3 and an input lead $f_o$. As long as this input lead is energised the oscillator emits frequency $f_o$ over the junction J, which is recognized at the other end as the commencement of the digital impulse train.

The oscillator OSC is a circuit which can be caused to operate at any one of $f_o$, $f_1$ and $f_2$ depending on which of its input leads is energised For this purpose it could consist of three simple oscillators each of which runs continuously and each of which is connected to the junction via a normally-closed gate. Energisation of one of the three input leads opens one of the three gates to enable the corresponding oscillator output. Another possibility is to have a single oscillator with separate tuned circuits, one of which is switched into the circuit, depending on which input lead is energised. In either case the oscillator output is transformer coupled to the junction over which transmission occurs.

To return to the operational description, during the 8 ms. pulse, and thus while the "prefix" of $f_o$ is going out, the first digit of the number to be sent is applied via a translator ST in a five-bit shift register SR1. The Translator ST can also be referred to as a staticiser. A staticiser, as is well known in the art, is a storing device for converting sequential information into static parallel information. The Shift Register SRL has a binary one bit located in its most significant stage to form a trailing bit, and has the decimal digit in the other four stages. When the output pulse from M1 ends, bistable circuit B1 is set to its START condition via a further trigger TR4 (triggered this time by the end of the output pulse from M1), as a result of which multivibrator MV1 is switched on.

MV1 produces a square-wave form each half-cycle of which is 4 ms. long, and the data bits are sent during the positive-going half-cycles and the "inter-bit" pauses during the negative half-cycles. During the first half-cycle from MV1, assumed to be positive-going, the output of the end-most stage of SR1, which contains the least significant bit of the digit, is examined. If this bit is a binary 1, gate GT2 opens to energise lead $f_2$, so that the frequency $f_2$ is emitted. Had the bit been 0, GT1 would be opened via an inverter I1, to give $f_1$. Thus during the first half-cycle the first digital data bit is sent out.

At the end of 4 ms. the multivibrator output goes negative to close gates GT1 and GT2 so that neither $f_1$ nor $f_2$ can be sent out. The negative output is applied via an inverter I4 and GT4 to the gate GT3 so that the oscillator output reverts to $f_0$. The output of I4 is also applied to a second monostable circuit M2 whose output is a 100 microsecond shift pulse, which shifts the contents of SR1 one step so that the least significant bit is lost and the second bit is in the end-most stage.

During the second positive half-cycle from MV1, the second bit is examined and set in the same way as for the first bit. Operation occurs in this way until all four bits have been dealt with, and the trailing bit mentioned above has been shifted to the least significant stage of SR1. When all four bits have been dealt with the shift register SR1 is at zero state, and when this condition exists, AND gate GT5 gives an output which passes via two buffer invertors I2 and I3, the first of which delivers a "zero" signal output, to a trigger TR2, the output from which triggers the monostable circuit M1 again. The second of which delivers a "not-zero" signal to a trigger TR3 and also resets B1 to its STOP position. It must be noted that the trailing bit is not transmitted over the function J.

The output from M1 is once again an 8 ms. pulse during which $f_0$ is produced via gate GT3, as before. During this pulse the second digit to be sent enters SR1, and operators continue in the same manner until all digits have been dealt with. When a new digit is placed in SR1, the most significant digit is set to 1 to provide the above-mentioned trailing bit for the register.

When the last digit has been sent, SR1 is found to be in its zero condition at the end of an 8 ms. pulse from M1, so that B1 is maintained in its STOP stage by the I2–I3 output, so that the output via TR4 cannot change B1 over. Hence the operation ceases.

If a digit arrives later, it is inserted in the shift register SR1 and the zero signal disappears. The "not-zero" signal from I3 is applied via trigger TR3 and gate GT6 to monostable circuit M1, so that the digit is sent out in the same way as the others. It will be seen that the "not-zero" output always triggers TR3 when a digit is inserted in SR1, but this is ineffective during normal operation.

The trailing bit referred to above ensures that a spurious zero indication will not be produced from gate GT5 when a combination such as 0001 is to be sent out. The inputs to GT5 are so connected to the stages of SR1 as to give an output only when the latter is at 00001, which indicates that a digit has been sent out.

It is now necessary to consider the receiving equipment which is shown in FIG. 2, and here also the arrangement will be described by describing what happens when a series of digits arrive over the junction J. The received signals are amplified by amplifier A1, and passed via a bandpass filter BF and a limiter LIM to three selective circuits one per frequency, these circuits being respectively marked $f_1$, $f_0$ and $f_2$. The output of these selective circuits are applied to three detectors D1, D2, D3 which each consist of a threshold detector and a Schmitt trigger.

When a signal train commences, the selective circiut $f_0$ and the detector D2 respond, and the output from D2 is applied via an integrator INT to a Schmitt trigger TR5, which latter produces a rectangular output pulse. The $f_0$ pulses, as already described, are either 4 ms. long or 8 ms. long, and discrimination therebetween uses the integrator INT. This latter is, in effect, a delay device, and only allows the output of D2 to trigger TR5 if the frequency $f_0$ is present for at least 5 ms. Hence as output from TR5 shows that either a new pulse train is starting or that an inter-digital pause has commenced.

If a signal $f_1$ or $f_2$ arrives, as happens after $f_0$, an output occurs from D1 or D3, which sets a bistable circuit B2 to it 1 or its 0 state depending on whether $f_1$ or $f_2$ arrived. During the next D2 output due to the "space" $f_0$, a monostable circuit M3 is triggered to give a 100 microsecond shift pulse, so the output of B2 is set into a receiving shift register Sr2. Operation occurs in a similar way for each bit, and when a complete digit has been received, the output from TR5 is detected as indicating an inter-digital pause. When this occurs a decoder DEC is energized, and decodes the digit in SR2 for use as required.

If the digit in SR2 is a dialled digit it is removed therefrom during the inter-digital pause by local shift pulses applied at LS to gate GT7, open due to TR5 being "on." Hence the digit is driven out over the output 0, and stored, for instance in a ferrite core store (not shown). At the end of the inter-digital pause, as indicated by the ending of frequency $f_0$, TR5 is reset to its rest condition.

In an alternate version of the above system the shift register SR1 is a six bit register, and during the insertion thereinto of a digit, 1 bits are placed in the last and most significant stages and the four bits of the digits in the other stages. The bit in the most significant places is the trailing bit mentioned above, and is not transmitted, while the bit in the last significant place is transmitted.

At the receiving end, see FIG. 3 the shift register SR2 has an extra stage and the coding bit is shifted progressively during reception until it reaches the last stage of SR2 when the entire digit has been received. When it reaches that stage, a bistable B3 operates and its operated output opens the gate GT7. This eliminates the need for the integrator and Schmitt trigger used in the arrangement of FIG. 2. Further, the existence of the inter-digital pause is "realised" by the receiver at an earlier time than is possible with the FIG. 2 arrangement. Finally, the need for an integrator, which is basically a timing device disappears, which is a good thing as such circuits may be difficult to make reliable. There is the disadvantage that the sending of an extra bit waste 8 ms. of time, but this disadvantage is more than compensated for by the advantages just mentioned.

It is to be understood that the foregoing description of specific examples of this invention is made by way of example only and is not to be considered as a limitation on its scope.

I claim:

1. In a digital transmission system, a digital transmission circuit comprising tone generating means for providing signals of either of three frequencies; a high, a low and an intermediate frequency, said transmission circuit for use in transmitting digital information through a telephone system, each of said three frequencies being in the voice frequency range normally transmitted through said telephone system, a shift register for receiving and storing groups of pulses representing digits, an extra pulse being stored with each group of pulses in the position in said shift register wherein said extra pulse will still be in the shift register when the the group of pulses has been shifted out of the register, said extra pulse representing a binary one, first monostable means for generating shift pulses to shift the group of pulses in the shift register sequentially out of the register, multi-vibrator means for producing a train of square wave pulses, first and second AND gate means having outputs for controlling said tone generating means, means for applying said square wave pulses to said first AND gate means, means for applying said square wave pulses to said second AND gate means, means for coupling the output of said shift register directly to said first AND gate means, whereby a binary one shifted from said shift register in conjunction with the positive portion of the square wave of said multi-vibrator means operates said first AND gate, means for coupling the output of said first AND gate to said tone generating means for providing the high frequency signal at the output of said tone generating means, first inverter means for changing zero signals to one signals, means for coupling said shift register means to said second AND gate through said first inverter means, mean for coupling said second AND gate to said tone generating means to provide the low frequency signal responsive to an output from said second AND gate whereby a low frequency signal is provided by said tone generating means if the signal from said shift register is a binary zero, second inverter means for coupling said multi-vibrator means to said first monostable circuit whereby said first monostable circuit is actuated to provide the pulse for shifting said shift register at the end of each cycle of said square wave, third AND gate means, means for coupling the output of said second inverter to the input of the third AND gate means, second monostable circuit means operated responsive to a proceed to send signal for providing a signal of a given time length, means responsive to said given time length signal for operating a first bistable circuit to a first condition providing a "start" output, means responsive to the operation of said first bistable circuit to the first condition for initiating the operation of said multi-vibrator circuit, means for connecting the start output condition of said bistable circuit to said third AND gate, first OR gate means, means for coupling the output of the third AND gate to said first OR gate means, means for also coupling the output of the second monostable circuit to said first OR gate means, means for coupling the first OR gate means to said tone generating means to cause said tone generating means to provide the intermediate frequency signal at its output, whereby the intermediate frequency signal is provided responsive to either the output of said second monostable circuit or to the simultaneous output of said second inverter and the start output from said bistable circuit, whereby said intermediate frequency is provided between said high and low frequency signals signifying bits and also during the interdigital spacing between said code cycle, said intermediate frequency during the interdigital time acting as prefix and suffix signals, said system further comprising a receiving circuit, said receiving circuit having code receiving means for detecting and distinguishing signals having said high, low and intermediate frequencies, and means for signalling an inter-bit condition responsive to pulses of said intermediate frequency of less than a certain length and an interdigital condition responsive to pulses of said intermediate frequency of more than said certain length.

2. The system of claim 1 including fourth AND gate means, said fourth AND gate means operated responsive to a new group of pulses being inserted into said shift register or to said shift register having shifted out said group of pulses representing a digit to provide a "not-zero" output signal or a "zero" output signal respectively, third inverter means operated responsive to said "not-zero" signal received from said fourth AND gate for providing an operating signal for operating said second monostable circuit, and fourth inverter means operated responsive to said "zero" signal for providing an operating signal for resetting said bistable circuit to remove said start signal and thereby turn off said multi-vibrator circuit means thereby ending the transmission of said signalling.

3. The system of claim 2 including a two way signal channel, tone generator means being located each end of said signal channel, means for transmitting said tones of each of said tone generator means over said signal channel in two directions, the three frequencies of the tone generator in one end of said channel being different from the three frequencies of the tone generator at the other end of said channel, whereby the direction of tone transmission is indicated by the frequency of the signal.

4. The system of claim 3 wherein said receiver means comprises a plurality of tuned filters, there being one filter for passing each of said frequencies, receiving shift register means, a single receiving bistable circuit coupled to the shift register means for operating said single bistable circuit to a first or second condition responsive to the output of said filters for said high and low frequencies, respectively, means responsive to the outputs of said receiving bistable circuit for operating the stages of the shift register to store binary zero or one according to the output of said receiving bistable circuit, means responsive to the interdigital intermediate frequencies for shifting said shift register, and means responsive to the intermediate frequencies sent during the interdigital time periods for decoding the output of said shift register, said last named means including delay means whereby said decoding means is not operated until said intermediate frequency pulse length is greater than said certain length.

References Cited

UNITED STATES PATENTS

| | | | |
|---|---|---|---|
| 2,947,814 | 8/1960 | Haner | 178—66 |
| 3,121,197 | 2/1964 | Irland | 325—163 |
| 3,206,678 | 9/1965 | Hannon | 325—30 |
| 3,261,922 | 7/1966 | Edson et al. | 179—3 |
| 3,268,862 | 8/1966 | Pettit | 178—66 |

KATHLEEN H. CLAFFY, Primary Examiner

A. B. KIMBALL, Jr., Assistant Examiner

U.S. Cl. X.R.

178—66